United States Patent
Spiro

(10) Patent No.: US 8,375,613 B2
(45) Date of Patent: Feb. 19, 2013

(54) ILLUMINATED SIGNBOARD WITH EDGE EFFECT

(75) Inventor: Steven Spiro, Chappaqua, NY (US)

(73) Assignee: Tracer Imaging LLC, White Plains, NY (US)

( * ) Notice: Subject to any disclaimer, the term of this patent is extended or adjusted under 35 U.S.C. 154(b) by 15 days.

(21) Appl. No.: 12/572,004

(22) Filed: Oct. 1, 2009

(65) Prior Publication Data

US 2010/0107463 A1 May 6, 2010

Related U.S. Application Data

(60) Provisional application No. 61/195,175, filed on Oct. 3, 2008.

(51) Int. Cl.
*G09F 13/18* (2006.01)
(52) U.S. Cl. .......................................... 40/546; 362/606
(58) Field of Classification Search ..................... 40/546
See application file for complete search history.

(56) References Cited

U.S. PATENT DOCUMENTS

| | | | | | |
|---|---|---|---|---|---|
| 5,536,558 | A | * | 7/1996 | Shelton | 428/167 |
| 5,579,598 | A | * | 12/1996 | Fallon et al. | 40/545 |
| 5,918,396 | A | * | 7/1999 | Jung | 40/546 |
| 6,240,664 | B1 | * | 6/2001 | Hjaltason | 40/546 |
| 7,024,809 | B1 | * | 4/2006 | Poma | 40/546 |
| 7,681,347 | B1 | * | 3/2010 | Welker et al. | 40/546 |
| 2007/0064444 | A1 | * | 3/2007 | Kim et al. | 362/612 |
| 2009/0100727 | A1 | * | 4/2009 | Chen | 40/546 |

* cited by examiner

*Primary Examiner* — Tashiana Adams
*Assistant Examiner* — Kristina Junge
(74) *Attorney, Agent, or Firm* — Leason Ellis LLP

(57) ABSTRACT

An illuminated signboard with edge effect for attachment to a support member includes a light guide having a body with a first face and an opposite second face and a light entry well formed therein. The second face includes a reverse bevel edge formed along a perimeter edge of the second face. The reverse bevel provides a luminous effect and directs light forward so that exits through the first face of a light guide in the form of an illuminated perimeter and the reverse bevel also provides an luminous halo cast on the support member in a band that exceeds and surrounds a physical perimeter of the signboard as a result of light being directed in an oblique, rearward manner relative to the light guide.

18 Claims, 5 Drawing Sheets

ILLUMINATED SIGNBOARD WITH EDGE EFFECT

CROSS-REFERENCE TO RELATED APPLICATION

The present application claims the benefit of U.S. Provisional Patent Application Ser. No. 61/195,175, filed Oct. 3, 2008 which is hereby incorporated by reference in its entirety.

TECHNICAL FIELD

The invention relates to illuminated signs and sign carriers. It also relates to signs using transparent sheet in which light is introduced via the edge of the sheet. The invention also pertains to the use of light-emitting diodes in edge-lighted displays.

BACKGROUND

The principle of edge-lighting is well known, and is used in signage, advertising displays, and flat-panel backlights such as those used to illuminate LCD screens. In the general application, light is introduced into the edge of an optically flat sheet of clear material and rebounded by total internal reflection. The major faces of the clear sheet are most typically in parallel planes. Light introduced in this manner will exit the sheet only upon reaching another edge, unless some other optical discontinuity is encountered.

The faces of a light guide panel may also be slightly skewed to yield a wedge shape, in which case some portion of light may progressively exit one or both major faces. Wedge shapes are more common to backlighting applications, although tapered panels are also know in the art of general illumination, advertising, and signage. Various systems have been devised to extract light from a edge-lit panel in a predetermined fashion. In edge-lit signage, the goal is often to illuminate a specific diffusive message or emblem. In the backlighting of electronic displays, the goal is most typically the even distribution of illumination. In both cases, electric lamps have been used in the past as the source of illumination. However, in many applications, solid-state sources such as light-emitting diodes have begun to supplant the use of filamented lamps or fluorescent tubes.

SUMMARY

In the invention, an illuminated signboard is devised using a sheet of transparent material, such as polymethylmethacrylate (i.e. PMMA, acrylic polymer). The signboard is devised so that it may be suspended from or located against an appropriate solid surface, such as a vertical wall. Light is introduced edgewise into the transparent sheet either via an internal edge wall or via an external edge wall.

Owing to the parallelism of the sheet's opposite faces, light then travels within the sheet by total internal reflection and is substantially contained within the sheet. Upon encountering a bevel conscientiously formed about the rear face of the transparent sheet, light is no longer inherently retained within the sheet.

Instead, a portion of the previously contained light is exits the transparent sheet from the bevel over a predictable range of angles. When the invention is disposed upon a diffusely reflective bearing surface, such as a light-colored wall, a halo of light is thereby projected from the signboard unit onto the bearing surface. The invention also provides for the use of standoffs of predetermined dimension, so that the location and intensity of the projected halo can be optimized.

In one embodiment, an illuminated signboard with edge effect for attachment to a support member includes a light guide having a body with a first face and an opposite second face and a light entry well formed therein. The second face includes a reverse bevel edge formed along a perimeter edge of the second face. The reverse bevel provides a luminous effect and directs light forward so that exits through the first face of a light guide in the form of an illuminated perimeter and the reverse bevel also provides a luminous halo cast on the support member in a band that exceeds and surrounds a physical perimeter of the signboard as a result of light being directed in an oblique, rearward manner relative to the light guide.

DETAILED DESCRIPTION OF THE INVENTION

Figure 1:
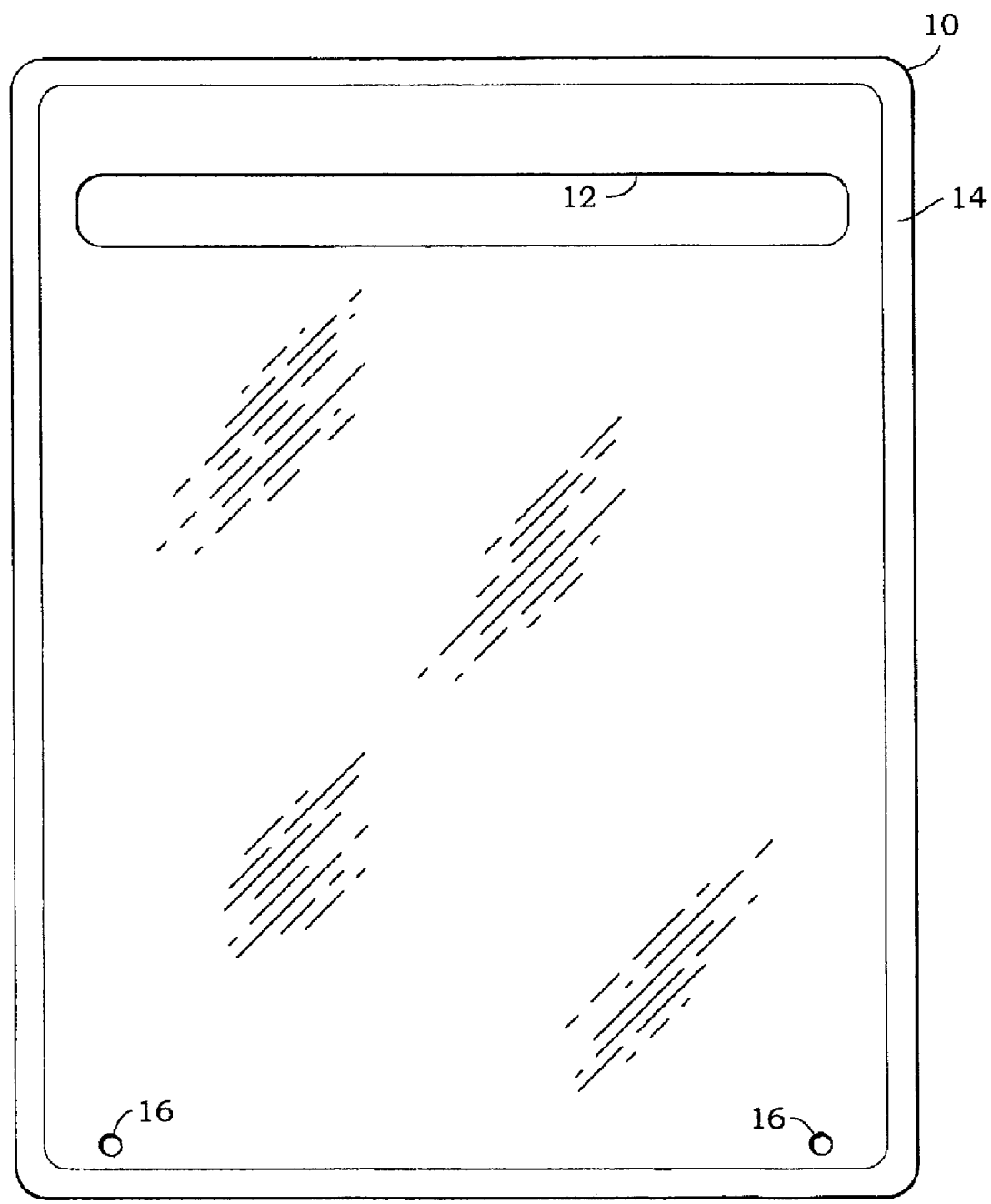
FIG. 1 illustrates a sheet of transparent material fabricated in a manner compatible with the present invention.

Referring now to, the figures, FIG. 1 illustrates light guide 10 devised of transparent material. The material can advantageously be devised of transparent acrylic polymer (polymethylmethacrylate/PMMA). The part can also be made from PETG, polycarbonate, or other suitable polymer. The light guide may also be fabricated from glass and tempered, if desired. The sheet will generally provide the brightest effect when transparent to all visible wavelengths, but may nevertheless electively be tinted or colored.

Light guide 10 includes light entry well 12. Light entry well 12 can be an elongate aperture through the sheet, but may also feasibly be a blind recess that is less deep than the full thickness of the transparent sheet. Reverse bevel 14 is formed on one side of the sheet. A suitable length as measured across the bevel is around 8 mm. A suitable bevel angle is in the vicinity of 25°. These values are given for completeness of description, and may of course be varied to achieve various pragmatic or visual results. The geometry and ultimate orientation of reverse bevel 14 may be further apprehended by concurrent reference to FIG. 7. The reverse bevel is shown following the contour of a rectangle with radiused corners. While this design is amenable to use within the invention, the invention is not restricted to this geometry, and the contour elected for any given design should be understood to be unlimited.

Fixture holes 16 provide subsequent entrance location for assembly and mounting hardware. Two fixture holes are shown here for the purpose of illustration. However, it may be appreciated that the number and location of fixture holes may be adapted to the scale of the device and the structural and operational demands of the materials employed.

Figure 2:
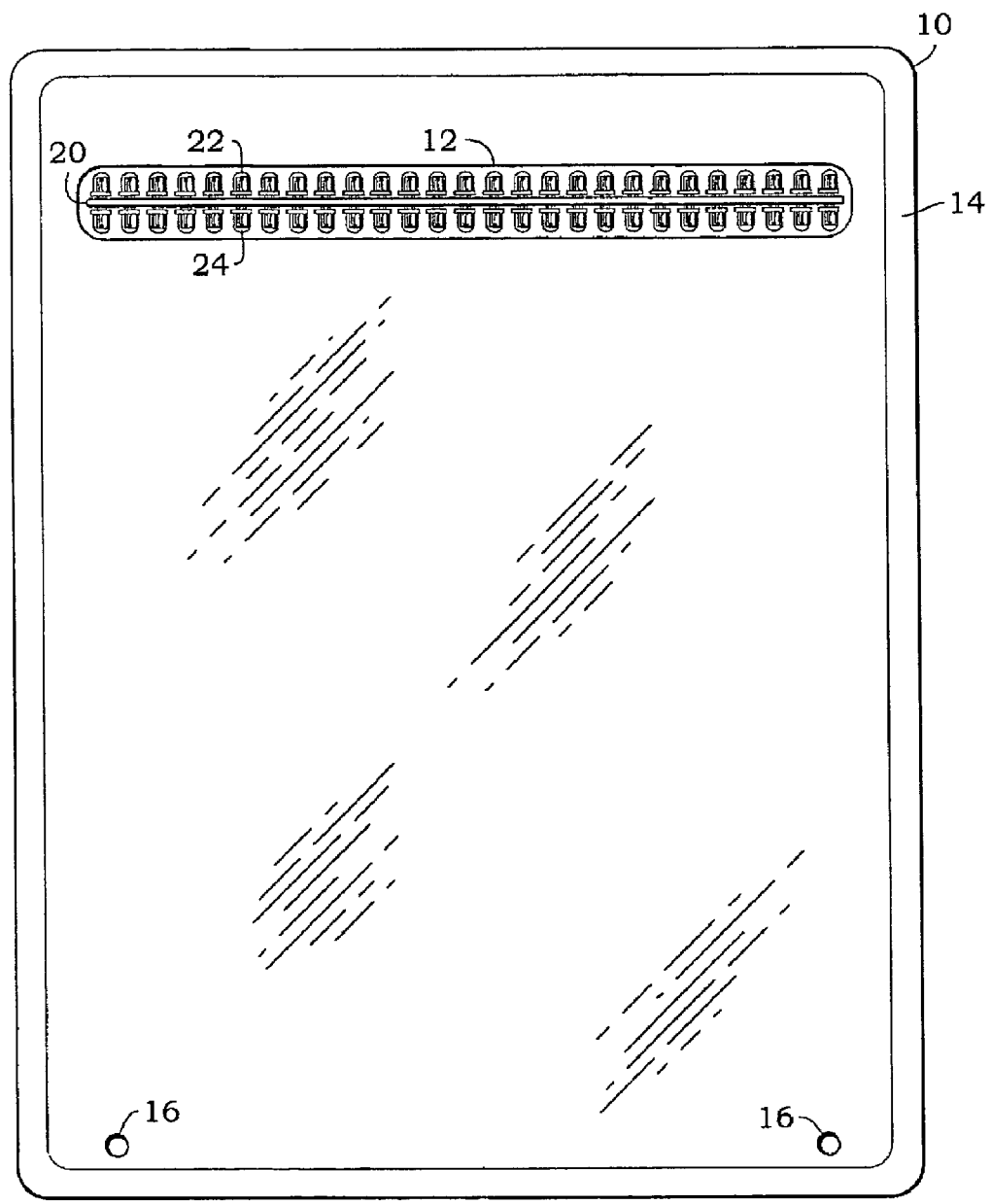
FIG. 2 illustrates a sheet of transparent material fabricated in a manner compatible with the present invention, and furthermore shows the positioning of a light-emitting diode array system in a well formed in the sheet.

FIG. 2 shows the location of a light-emitting diode (LED) array within light entry well 12. Dual row LED array 20 illustrated here includes two rows of LEDs, each row disposed to emit in an outward and opposite fashion relative to the other. The discrete LEDs may be of any form, including individual convex lenses, multi-element components, low-profile edge-emitters, or surface-mount devices. Wiring and driving components may be enclosed within the volume of the light well. However, in the depicted embodiment, these elements are enclosed with housing 30. The housing is ultimately installed behind the LED arrays and behind light guide 10. Its design and location are detailed in FIGS. 3 through 6 inclusive.

Figure 3:
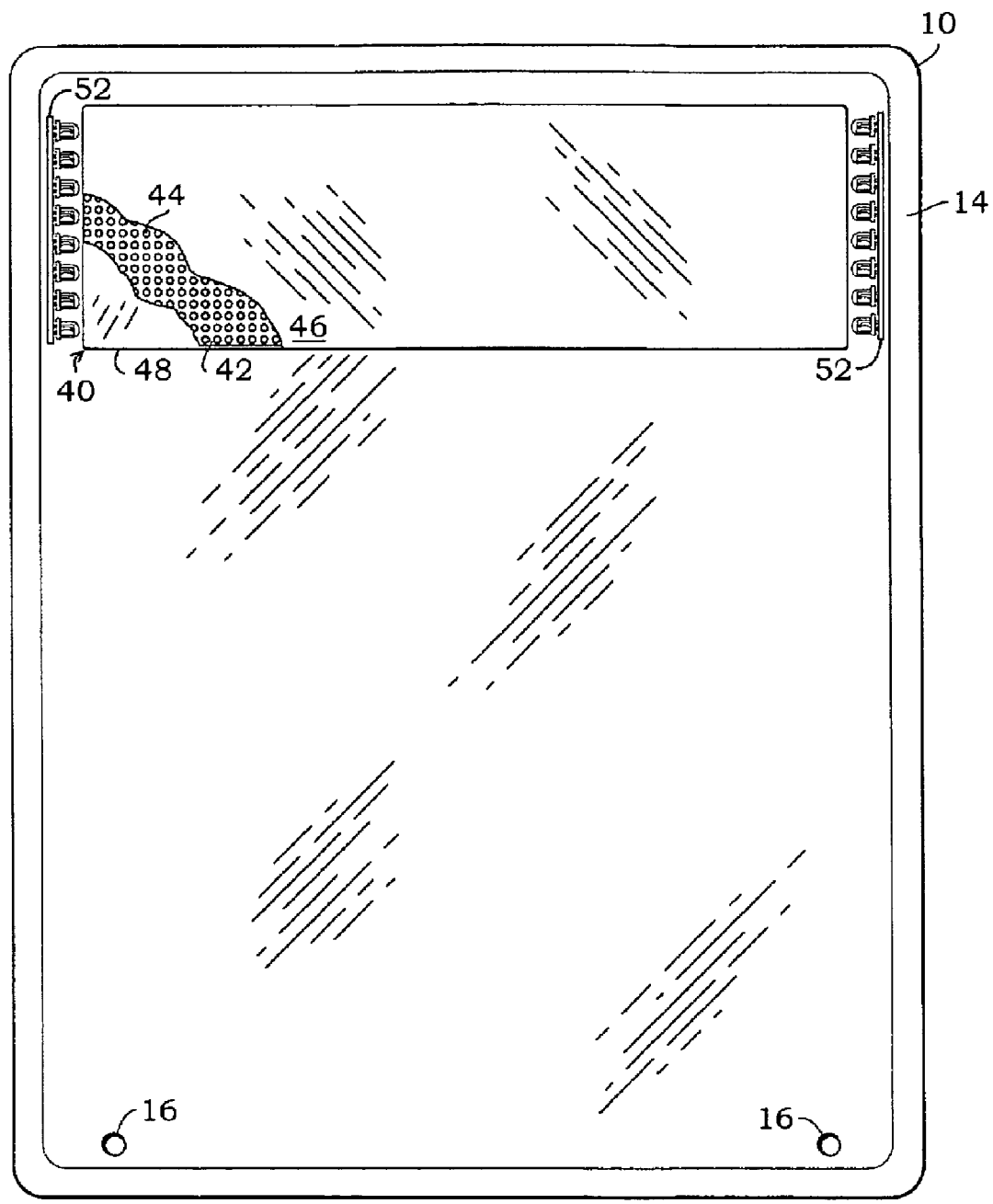
FIG. 3 shows is a partial cutaway drawing showing inner features of an independently illuminated header.

FIG. 3 shows the disposition of header internal subassembly 40 over light entry well 12 and the dual row LED array 20 shown previously in FIG. 2. For additional understanding of the structure and appearance of header features, simultaneous reference may be made the assembled header component shown in FIGS. 6 and 7.

Header internal subassembly 40 includes light generation, guiding, and distribution elements. Header internal subassembly 40 is ultimately included within header lighting assembly 50, as shown in subsequent FIGS. 6 and 7. In the illustrated embodiment, header lighting assembly 50 is operationally and structurally independent of the lighting system relating to the larger light guide 10.

Header light guide 42 may be usefully fabricated of acrylic of approximately 5 mm in thickness. In the version depicted, header light guide 42 incorporates a plurality of diffusing features 44. Examples of integrated diffusing features include relief or incused elements such as through-holes, stopped holes, grooves, troughs, domes, pyramids, prisms, knurling, scratches, dimples, or corner cubes. Alternately, these or other optical relief features may be formed on a separate surface, such as a clear polyester film, and then applied to, or against, header light guide 42.

A further variation of the diffusing features may employ a pattern of colorant such as white ink or paint. The ink or paint may be disposed in a pattern of dots upon one of the faces of the light guide. Most typically, the white colorant would be applied to the rearmost surface if header light guide 42 so that light would be reflected from that location and then diffused predominantly through the front face of the light guide.

The pattern of either relief or pigmented features may be regular or randomized according to diverse design variations, include variations which are intended to equalize otherwise unequal output. Application of the colorant may advantageously be achieved by screen printing, but successful application may imaginably be by other methods, such as aerosol spray. In an exemplary case of the invention, the header may be illuminated by vertically disposed LED arrays 52 located at either end of header light guide 42 so that light from the vertically disposed LEDs is inserted into the body of the light guide at two opposite edges.

The LEDs employed within the header can be of any spectral composition, but may amenably be nominally white LEDs. White LEDs are commonly made by the inclusion of two or more diodes within a single diode package, or by the disposition of a broadband phosphor mixture around a single semiconductor diode. The election of nominally white diodes for the header allows any superposed artwork, such as a printed transparency, to display a wide color gamut upon its illumination.

The front face of header light guide is here surmounted by translucent overlay 46, which can be a polymer film in which either fine surface patterning or diffusive pigment has been incorporated. The function of translucent overlay 46 is to scatter light exiting the front face of light guide, so that the emitted light level is effectively equalized at the display surface. Owing to the superposition of the translucent overlay, light is diffused more finely and evenly, so that any residual pattern resulting from the configuration of diffusing features 44 within light guide 42 is diminished or eliminated.

Any light escaping the header light guide from the rear face encounters reflective sheet 48 and is collected and rebounded back into the header light guide toward the visible surface of the header panel. The reflective sheet can be flat white or aluminized polymer film, but may also electively include light-directing structures or textures.

Figure 4:
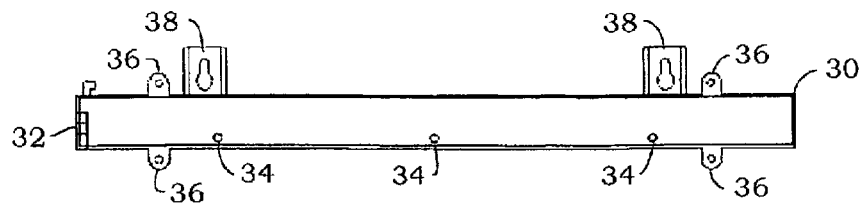
FIG. 4 shows an elevation view of a housing that encloses of light-emitting diode array system components, and which also serves as a top spacer providing an offset between the planar panel components and a mounting surface.
Figure 5:
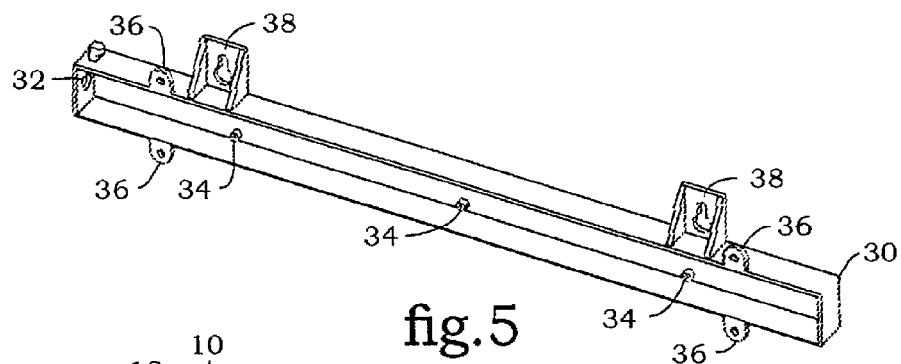
FIG. 5 shows a perspective view of the part illustrated in FIG. 4.

The elevation view in FIG. 4 and the perspective view in FIG. 5 illustrate housing 30. In the illustrated example, the housing provides means for enclosing light sources, wiring, and drive electronics. The housing includes power cord access hole 32 and circuitry mounting holes 34. Housing attachment holes 36 provide means for the juncture of housing 30 and any enclosed components (not shown in FIG. 4) to a compatible surface.

Keyhole hanger tabs 38 provide means for the hanging the assembled device from a wall or other suitable support.

The housing would typically be injection molded in a thermoplastic polymer such as acrylonitrile butadiene styrene (ABS). However, other plastics or, for example, a fabricated metal housing may be substituted for the ABS polymer housing. ABS polymer is typically made opaque and light absorbing by the integration of a black colorant. The black colorant should be selected so that it is not fugitive in the presence of visible light. Carbon black is an example of such a colorant.

Figure 6:
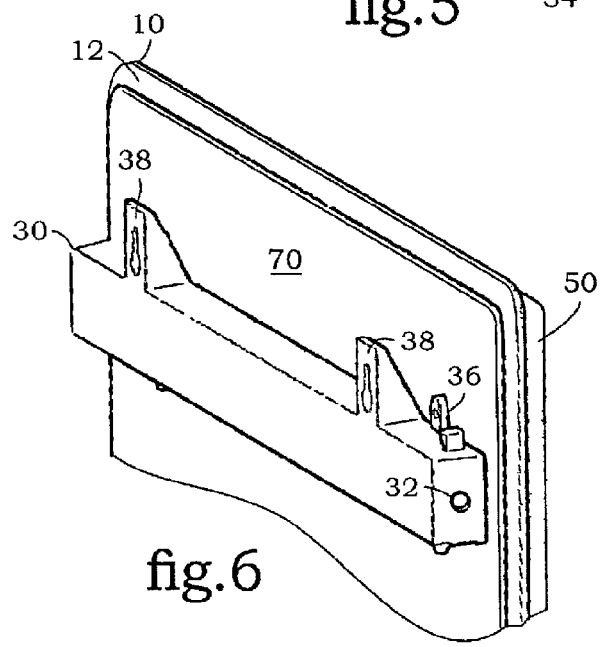
FIG. 6 shows a perspective detail of the top portion an assembled signboard device.

FIG. 6 shows a perspective detail of the top portion of an assembled signboard device. Luminescent header internal subassembly 40 is disposed against the planar external face of light guide 10. The header internal subassembly and header message carrier 54 are held in intimate contact by perimeter header bezel 58. Header message carrier 54 is typically a transparent polymer film, here shown including exemplary printed indicia 56.

The bezel may be retained in place by various means, including screws inserted into through-holes from the rear side of the assembly. The luminescent header may be illuminated using light emitted by the LED array, but may alternately or additionally be outfitted with a discrete light emission means. Such means may include electroluminescent sheeting, or lamping, such as one or more vacuum fluorescent tubes (not detailed here).

Backing panel 70 can be any suitable rigid sheet material, but will generally be selected with a preference for a degree of light absorption. An example of an appropriate choice is 1 mm thick (ABS) polymer made opaque and light absorbing by the inclusion of a black colorant. Black rigid polyvinyl chloride (PVC) or black acrylic (PMMA) can provide alternate backing panel materials. The backing panel can also be devised, for example, using dyed fiberboard, or any other functionally effective substitute.

Figure 7:
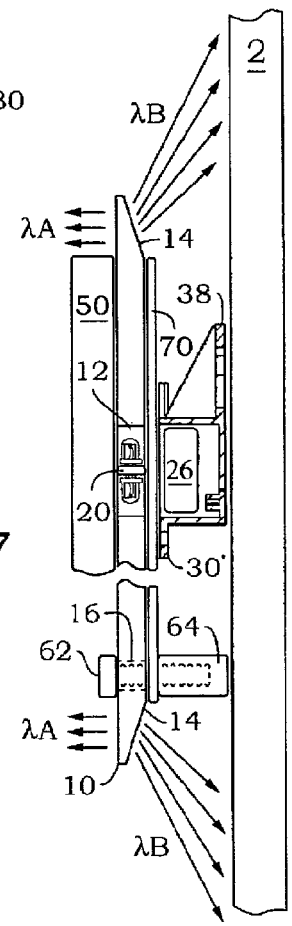
FIG. 7 is a sectional view showing the operation of an embodiment of the invention while mounted on a vertical surface.

FIG. 7 is a sectional view showing the structure of an embodiment of the invention oriented against a vertical surface, such as a wall. In the illustration, the vertical length of the device has been foreshortened, as suggested by the break lines, in order to show related upper and lower features.

Enclosed drive electronics 26 are represented only schematically, and may in practice include current-limiting resistors, timing circuits, computer interfaces, color and intensity controls, light-responsive or sound-responsive sensors, connectors, busses, semiconductor components, components mounts, circuit boards, fasteners, standoffs, lamp bases, lenses, switches, relays, ballasts, power supplies, dimmers, cables, stress relief features or elements, or any other features necessary for the successful operation of a given design.

Anticipated electronic features might commonly include resistors to prevent destructive current levels, and pulsed drive circuitry to maximize the life of the LEDs. The LEDs in arrays need not be identical, but can have disparate spectra. For example, the array can include a repeating arrangement of red, green, and blue LEDs. The array may then be conscientiously driven to produce a full gamut of apparent colors, including, for example, orange, cyan, violet, magenta, yellow, or white, as well as the nominal colors of the discrete LED elements.

In FIG. 7, threaded fastener 62 has been inserted through fixture hole 16 and into internally threaded spacer 64. The spacer is elected or devised to have a length equal to the depth of housing 30 so that a constant dimensional offset is maintained between the back of light guide 10 and wall 2.

Figure 8:
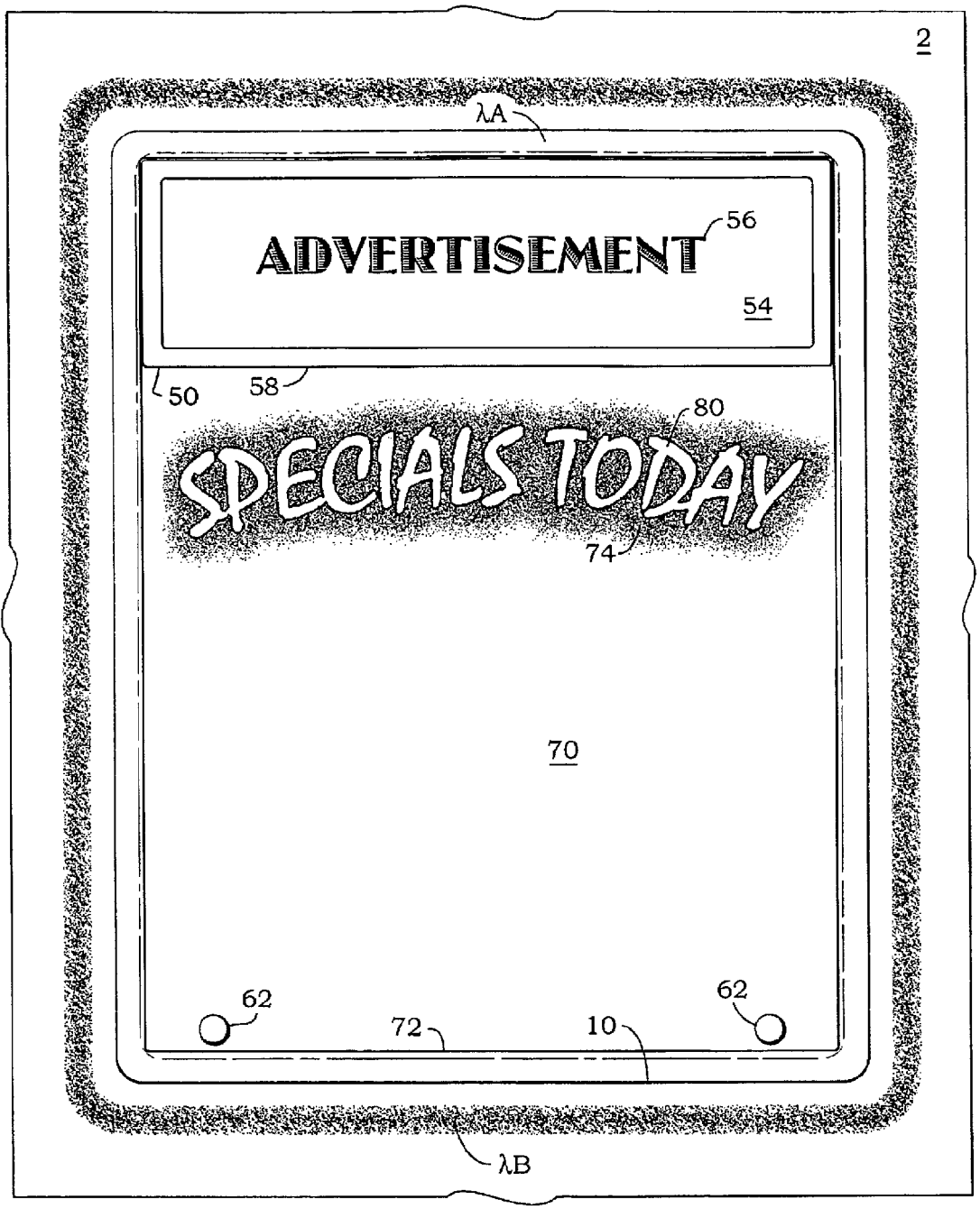
FIG. 8 is a front view of an embodiment of the invention showing the projective optical effect of the reverse bevel.

FIG. 8 shows the fully assembled illuminated display panel, which will be described now in reference to the operation of then invention.

The operation of the invention may be best appreciated by concurrent reference to FIGS. 7 and 8. It should be generally appreciated that the illumination system and drive components for the header may be fully independent of those serving the signboard.

Referring now to the front view of the exemplary embodiment, it may be understood that Header lighting assembly 50 here includes exemplary printed indicia 56 presenting any desired message or image. The indicia can be printed by various means, including injkjet, thermal, photographic, lithographic, serigraphic, or dye sublimation processes. Perimeter header bezel 58 surrounds and retains the printed indicia, and can be devised so that the message can be electably changed, replaced, or updated.

In one anticipated embodiment, the header is independently illuminated from behind by diffuse, broadband visible light. The perimeter bezel in the depicted embodiment is reversibly removable so that an image transparency can be inserted and then retained within the header subassembly. The bezel may be held in place by various means, including friction, snap fittings, fasteners, tape, or reversible adhesive. In an anticipated application of the invention, the header image is typically illuminated from behind at a constant level. Nevertheless, the illumination level can readily be made adjustable or automatically responsive to ambient light levels by means well know to those practiced in the art of lighted signage.

The use of edge-lighted signboards designed to carry erasable messages is known in both the prior art and in commercial practice. In this general practice, light is introduced via the edge of a clear sheet. Subsequent to its insertion, light rebounds internally off the opposing polished faces of the sheet. Because of the efficient of internal reflection, virtually no light exits either face of the transparent sheet. Therefore, if the sheet is located over a dark surface, but not optically coupled to it, a viewer will see the dark background without any meaningful illumination being apparent from the source of edge lighting.

However, if a writing instrument is provided that provides optical coupling at any location of its contact with the external face of the transparent sheet, the repeated internal reflection will be interrupted at those locations. Light can then locally pass from the sheet so that any handwritten message or image can be seen by an observer as an illuminated design. In practice, this temporary and reversible writing system has been found to be an intuitive method for providing a simple changeable display having a pleasing neon-like visual quality. The high contrast and dynamic range of the illuminated script also draw attention to the executed temporary message.

The writing instrument may be composed any material or compound that is sufficiently soft to both optically couple with the transparent sheet and avoid any marring of its surface. The instrument's composition should ideally be such that light is broadly diffused out of the light-guiding transparent sheet without inducing opacity or absorption of the escaped light. Various writing materials are presently available, typically using compositions that include waxes or greases. These crayons can be colorless, but can also include pigments or fluorescent dyes. Crayons including fluorescent dyes are often favored when edge lighting is provided by fluorescent lamps or ultraviolet sources.

However, it may be appreciated that when light is extracted from the edge-illuminated panel only at those locations where writing has been imparted that a majority of light will continue to rebound internally across and within the transparent sheet. Therefore, in prior practice, residual light is simply lost when it exits the sheet at the edge opposite its point of entry. Light exiting the edge is diffused into the surrounding environment.

In the present invention, light is captured and directed by the use of a conscientiously formed reverse bevel formed on the transparent light-guiding sheet. The useful luminous effect of the bevel can be twofold. First, a portion of the previously unexploited light may be directed toward the viewer and exit through the sheet's planar external face. In this manner, the display is provided with a bright, illuminated perimeter having a width essentially equally to the exposed width of the reverse bevel.

Second, a proportion of the light reaching the bevel will escape the perimeter in an oblique, rearward fashion. When the display is located on surface such as a wall or partition, particularly if that surface is light-colored and conscientiously set apart from the locus of emission, the surface will be subject to projective illumination from light escaping from the reverse bevel. The observed effect is of a luminous halo cast on the wall in a band that exceeds and surrounds, the physical perimeter of the display unit.

These features and effects may now be understood by particular reference to FIGS. 7 and 8. Backing panel 70 is formed of a substantially light-absorbing material such as a black colored plastic. Backing panel 70 is delimited by backing panel perimeter 72. Handwriting 80 imparted by a diffusive crayon or marker captures internally reflected light and causes the message to appear luminous against relatively dark backing panel background 74. While the shading is localized in the drawing for the sake of legibility, in common practice the entirety of backing panel 70 would present a dark aspect.

The apparent chromatic makeup of the handwritten message depends upon the spectral composition of the source of illumination, in combination with any colorants in the marking instrument and any influence of ambient light. In the case of the LED illumination used by way of example in these depictions, the light introduced can be intense and quasimonochromatic. In this practice, therefore, it may be appreciated that the color of the handwriting may often be most strongly influenced by the active spectral composition of the light sources.

Referring now to FIG. 7, the division of light at the reverse bevel, as well as its pattern of directed emission, may be appreciated by the arrows in the drawing. The set of arrows at λA indicate emission, after incidence on reverse bevel 14, through the planar front face of light guide 10. Emission λA occurs only at the visible perimeter region corresponding to the physical extent of reverse bevel 14.

A secondary emission occurs directly via the surface of the reverse bevel, as suggested by the arrows at λB. This diffuse emission is captured and further diffused by the presence of an ambient surface such as wall 2. The observed effect is of a halo or glow surrounding the display, the pattern of which is suggested by the shaded region associated with λB in FIG. 8.

The effect of surrounding signboard or other visual display with a border or halo of illumination may be understood to have both ornamental and practical effects. For example, the invention improves the advertising value of message by better calling attention to the matter in the printed header. The invention also draws the observer's interest to the temporary handwritten text. The illustrated embodiment of the invention also makes more efficient use of light, as little light is lost to the ambient surroundings, and nearly all light is placed in service of the communication of the intended messages.

It should be appreciated that there are many anticipated versions, adaptations, and substitutions imagined within the intended scope of the invention. For example, light may be introduced through multiple wells, or through one or more edge locations. The display may be provided with a base so that it is self-supporting.

In additional to the open region suitable for hand-writing, the light-guiding panel can carry additional printed, etched, or engraved indicia such as logos, titles, signage, etc., which may, for example, complement the content of the header.

The chromatic or temporal pattern of illumination can be regulated to complement a given theme. For example, the LED driving circuitry can be tuned so that its emission spectrum in a given control state is confined to that associated with a particular logo, business, national identity, athletic team, holiday, tradition, or institution. Any of these selections may be preprogrammed into the device architecture and initiated optionally by a distributor, technician, or end user.

The bevel may be patterned or contoured to provide a variety of effects. The pattern or contour may be highly detailed, for example, to generate a sawtooth, convolute, or stepped bevel, or to generate a periodic pattern, whether directly visible or projected. The bevel can be scored, abraded, or otherwise textured or ornamented to promote a particular result.

Fasteners and fastening methods used within the invention can include, but are not limited to, screws, bolts, plastic or metal rivets or pins, integrated catches and detents, thermally staked posts, snaps, clips, springs, nuts, threaded inserts, T-nuts, anchors, eye bolts, tapes, or adhesives.

The informational content of the invention is not intended to be limited to advertising, and embodiments of the invention may be applicable, for example, to emergency, transportation, hospitality, or municipal signage.

The invention therefore should not be taken to be constrained by the examples described in application, but rather should be understood to be limited only by the broadest reading of any claims to be subsequently appended in the pursuit of this application and any of its dependent, divisional or derivative forms.

What is claimed is:

1. An edge-lit, electrically illuminated signboard formed as an assembly that is viewed from a first direction and configured to project a luminous halo onto a support member which supports the signboard, comprising:

a first light guide having a body in the form of substantially planar sheet, the first light guide have a first face, a second face, and a reverse bevel, the first and second faces being substantially parallel to one another and the reverse bevel being disposed intermediate to outer peripheral edges of said first and second faces, the first light guide having an internal light entry well formed therein for introduction of light from within a bounds of the first light guide, the internal light entry well interrupting at least one of the faces of the first light guide such that light is introduced edgewise from within bounds of the first light guide;

a second light guide having a body in the form of a substantially planar sheet, the second light guide having a first face, a second face, the first and second faces being substantially parallel to one another, the second light guide having an edge intermediate between the first and second faces thereof such that light is introduced edgewise from outside the bounds of the first light guide;

a first light emitting diode (LED) array including at least one set of outward-facing LEDs, wherein the first LED array is disposed within the internal light entry well in the first light guide;

a second light emitting diode (LED) array including at least one set of inward-facing LEDs, wherein the second LED array is disposed within a region external to the second light guide;

a reflective sheet disposed between the first light guide and the second light guide for optically isolating the first LED array from the second LED array, the reflective sheet having a reflective surface such that any light escaping the second light guide is collected and rebounded back toward the second light guide, thereby isolating the first LED array from the second LED array;

a first means for diffusing light from a front and a rear of the reverse bevel formed upon the first light guide such that light directed from the front of the reverse bevel exits the first face of the first light guide in the form of an illuminated perimeter and light diffused from the rear of the reverse bevel forms the luminous halo; and a second means for diffusing light from the front face of the second light guide;

wherein the first light guide, the first LED array, and an opaque backing panel define a signboard subassembly, the opaque backing panel being formed of a substantially light-absorbing material, the opaque backing panel being located against a back of the first light guide, and an opaque housing, the housing extending from the back of the first light guide and overlaying an area corresponding to a location of the first LED array;

wherein the second light guide, the second LED array, the reflective sheet, the second light diffusing means, and a printed image define a header subassembly, the header subassembly collectively being disposed over and in front of the first LED array and against the first face of the first light guide which is a planar external face;

wherein the signboard subassembly and the header subassembly define a header signboard assembly that allows sufficient area upon the first planar external face of the first light guide for a message to be written by a diffusive, optically coupling writing instrument;

wherein light emitted from the first LED array within the first light guide is projected obliquely by the reverse bevel onto the support structure to form the luminous halo upon the support structure such that the projection of light visibly exceeds and surrounds the bounds of the header signboard assembly and light from the first LED array forms the illuminated perimeter;

wherein light emitted from the second LED array within the second light guide is projected diffusely forward through the printed image;

whereby the signboard assembly provides two operationally and structurally independent illuminated display systems oriented in a common first direction while providing differing illumination effects.

2. The signboard of claim 1, wherein the first light guide comprises a transparent sheet and the luminous halo has a width that is at least that of an exposed width of the reverse bevel.

3. The signboard of claim 1, wherein the illuminated perimeter has a width substantially equal to an exposed width of the reverse bevel.

4. The signboard of claim 1, wherein at least one of the first and second means for diffusing light incorporates a plurality of diffusing features selected from the group consisting of through-holes, stopped holes, grooves, troughs, domes, pyramids, prisms, knurling, scratches, dimples and corner cubes.

5. The signboard of claim 4, wherein a translucent overlay is disposed over the first face of the second light guide, the translucent overlay scattering light exiting the first face of the second light guide.

6. The signboard of claim 1, wherein at least one of the first and second light guides includes a diffusing feature employing a pattern of colorant selected from the group consisting of white ink and paint.

7. The signboard of claim 1, wherein the angle of the reverse bevel is about 25 degrees.

8. The signboard of claim 1, wherein the first LED array disposed within the light entry well is formed of two rows of LEDs, each row disposed to emit in an outward and opposite fashion to one another.

9. The signboard of claim 1, wherein the second LED array comprises two rows of LEDs that are vertically disposed at either end of the second light guide so that light is introduced into the body of the second light guide at two opposite edges.

10. The signboard of claim 9, wherein an electrical connection is formed between the LEDs of the first and second LED arrays and the housing and the header subassembly are disposed over the first LED array to permit the first LED array to illuminate the first light guide and the second LED array to illuminate the header subassembly.

11. The signboard of claim 1, wherein the housing contains drive electronics.

12. The signboard of claim 1, wherein the bevel includes at least one of a pattern and contour to provide additional effects.

13. An edge-lit, electrically illuminated signboard formed as an assembly that is viewed in a first direction and configured to project a luminous halo onto a support member which supports the signboard, comprising:

a first light guide having a body that includes a front face, a rear face, and a reverse bevel disposed intermediate to outer peripheral edges of the front and rear faces, the first light guide having an internal light entry well formed therein for introduction of light from within the first light guide, the internal light entry well being open along at least one of the front and rear faces of the first light guide such that light is introduced edgewise from within the first light guide;

a second light guide having a body including a front face, a rear face, the second light guide having an edge intermediate between the front and rear faces thereof such that light is introduced edgewise from outside bounds of the first light guide;

a first light emitting diode (LED) array including at least one set of outward-facing LEDs, wherein the first LED array is disposed within the internal light entry well in the first light guide, wherein the one set of outward-facing LEDs emit light in a direction toward the outer peripheral edges of the first light guide;

a second light emitting diode (LED) array including at least one set of inward-facing LEDs, the second LED array being offset and spaced from the first LED array, wherein the one set of inward-facing LEDs emits light in a direction toward a center of the second light guide;

a light barrier in the form of a reflective sheet disposed between the first light guide and the second light guide for optically isolating the second LED array from the first LED array, the reflective sheet having a reflective surface such that any light escaping the second light guide is collected and rebounded back toward the second light guide, thereby optically isolating the second LED array from the first LED array;

a first means for diffusing light from a front and a rear of the reverse bevel formed upon the first light guide such that light directed from the front of the reverse bevel exits the front face of the first light guide in the form of an illuminated perimeter and light diffused from the rear of the reverse bevel forms the luminous halo upon the support structure;

a second means for diffusing light from the front face of the second light guide;

an opaque backing panel being formed of a substantially light-absorbing material and being located against the rear face of the first light guide, and an opaque housing, the housing extending from the rear face of the first light guide and overlaying an area corresponding to a location of the first LED array;

a message area that is part of the first light guide and includes an open region suitable for hand writing which appears luminous;

wherein the second light guide, the second LED array, the reflective sheet, the second light diffusing means, and a message carrier for displaying graphic indicia collectively are disposed over and in front of the first LED array and against the front face of the first light guide which is a planar external face thereof;

wherein light emitted from the first LED array within the first light guide is projected obliquely by the reverse bevel onto the support structure to form the luminous halo upon the support structure such that the projection of light visibly exceeds and surrounds the bounds of the signboard and light from the first LED array forms the illuminated perimeter; and wherein light emitted from the second LED array within the second light guide is projected diffusely forward through the printed image;

whereby the signboard is constructed such that material properties of the light isolating member isolates light displays generated by the first and second LED arrays and the first and second light guides, respectively, the isolated light displays being viewed from a same side of the signboard in the first direction.

14. An edge-lit, electrically illuminated signboard formed as an assembly that is viewed in a first direction and configured to project a luminous halo onto a support member which supports the signboard, comprising:

a first light guide having a body that includes a front face, a rear face, and a reverse bevel extending between outer peripheral edges of the front and rear faces along a perimeter of the body, the first light guide having an internal light entry well formed in an intermediate region of the body between the outer peripheral edges thereof, the internal light entry well being at least open along one of the front and rear faces of the first light guide such that light is introduced edgewise from within the first light guide;

a second light guide having a body including a front face, a rear face, the second light guide having an edge intermediate between the front and rear faces thereof such that light is introduced edgewise from outside bounds of the first light guide;

a first light source including outward-facing lights that face outwardly toward the reverse bevel formed along the perimeter of the body, wherein the first light source is disposed within the internal light entry well in the first light guide, the first light source being fully contained within the first light guide between surfaces defined by the front and rear faces thereof;

a second light source including inward-facing lights, the second light source being part of the second light guide, wherein the second light source is disposed within a first plane that is offset and spaced parallel relative to a second plane containing the first light source, the first plane being in front of the second plane as viewed in the first direction;

a first means for diffusing light from a front and a rear of the reverse bevel formed upon the first light guide such that light directed from the front of the reverse bevel exits the front face of the first light guide in the form of an illuminated perimeter and light diffused from the rear of the reverse bevel forms the luminous halo upon the support structure;

a second means for diffusing light from the front face of the second light guide; and an opaque backing panel being formed of a substantially light-absorbing material and being located against the rear face of the first light guide, wherein the reverse bevel of the first light guide surrounds the backing panel;

wherein the first and second light guides are constructed and positioned such that they are operationally and structurally independent units with illumination of the second light guide occurring only from the second light source and the first light source serving to only activate an area for luminous writing on the first light guide and generate the illuminated border around the second light guide and the luminous halo upon the support structure.

15. The signboard of claim 14, wherein portions of the front and rear faces of the first light guide that surround the light entry well are planar surfaces that are parallel to one another.

16. The signboard of claim 14, wherein each of the first and second light sources comprises a light emitting diode (LED) array.

17. The signboard of claim 14, further including a reflective sheet that is disposed between the first and second light guides, the reflective sheet being constructed such that any light from the second light source that escapes the second light guide is collected and directed back into the second light guide toward the front face thereof.

18. The signboard of claim 14, further including a housing disposed along the backing panel, the housing extending outwardly from the rear face of the first light guide, the housing containing drive electronics.

* * * * *